United States Patent [19]

Girard

[11] 4,165,619
[45] Aug. 28, 1979

[54] METHOD OF CONTROLLING A HEAT PUMP, AND A HEAT PUMP DEVICE ADAPTED TO OPERATE IN ACCORDANCE WITH SAID METHOD

[75] Inventor: Edmond Girard, Boulogne, France

[73] Assignee: Messler, Société Anonyme, Paris, France

[21] Appl. No.: 855,542

[22] Filed: Nov. 29, 1977

[30] Foreign Application Priority Data

Jan. 5, 1977 [FR] France ................................ 77 00112

[51] Int. Cl.² ...................... F25D 17/02; F25B 29/00; F25B 1/00
[52] U.S. Cl. .......................................... 62/99; 62/159; 62/227
[58] Field of Search ............................. 62/99, 159, 227; 165/22

[56] References Cited

U.S. PATENT DOCUMENTS

| | | | |
|---|---|---|---|
| 2,279,657 | 4/1942 | Crawford | 62/159 |
| 3,127,928 | 4/1964 | Ringquist | 62/159 |
| 3,378,062 | 4/1968 | Ringquist et al. | 62/159 |
| 3,513,663 | 5/1970 | Martin, Jr. et al. | 62/159 |

Primary Examiner—Lloyd L. King
Attorney, Agent, or Firm—J. Harold Nissen

[57] ABSTRACT

A heat pump device and method of controlling the heat pump device which includes a cold generating fluid circuit, a first heat exchanger associated with the circuit in order to draw calories from a heat containing fluid passing through a cooling circuit, and a second heat exchanger associated with the circuit in order to transmit calories to a fluid passing through a utilization circuit.

The method comprises the steps of controlling the flow of heat-carrying fluid through the first heat exchanger in dependence upon the temperature of the fluid of the utilization circuit at the output of the second heat exchanger, and controlling the flow of fluid from the utilization circuit through the second heat exchanger in dependence upon the temperature or pressure of the cold generating fluid at the outlet of the second heat exchanger.

The heat pump device includes a temperature sensor arranged in the utilization circuit at the outlet of the second heat exchanger, a first motorized valve arranged to control the flow of heat-containing fluid from the cooling circuit through the first heat exchanger in accordance with the output of a temperature sensor arranged in the utilization circuit at the outlet of the second heat-exchanger, a temperature or pressure sensor arranged in the cold generating fluid circuit at the outlet of the second heat exchanger, and a second motorized valve arranged to control the flow of fluid from the utilization circuit through the second heat exchanger in accordance with the output of the temperature or pressure sensor.

9 Claims, 1 Drawing Figure

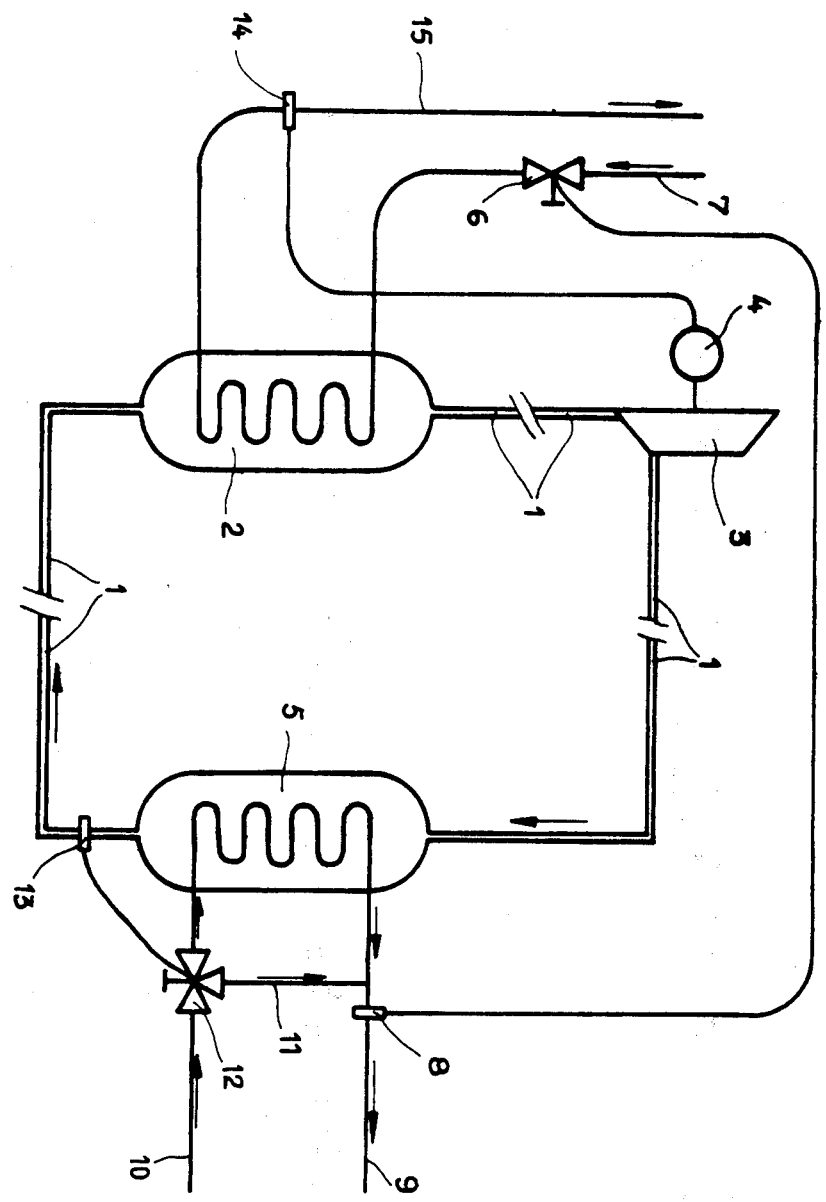

METHOD OF CONTROLLING A HEAT PUMP, AND A HEAT PUMP DEVICE ADAPTED TO OPERATE IN ACCORDANCE WITH SAID METHOD

This invention relates to a method of controlling a heat pump, and a heat pump device adapted to operate in accordance with said method.

The invention concerns in particular heat pumps of the type adapted to utilise the calorific energy contained in any accumulating generator such as that formed by external or exhaust air (from premises in which "ordinators", for example, dissipate heat) or by any set of natural elements, such as the water of the phreatic strata and the ground (geothermal source) and of which the thermal properties render its application as a cold source of a heating and/or air-conditioning plant of industrial or private premises, of interest.

The present invention relates to the control of heat pumps of known type which draw calories from a cold source and transmit them to an utilisation fluid which thereupon carries them into the premises, these heat pumps being thermally coupled in conventional manner with a circuit for cooling the cold source by means of at least one first exchanger, wherein a cold-generating fluid flowing within the heat pump absorbs surplus calories entrained by a heat-carrying fluid coming from the cooling circuit of the cold source, these calories being restored to the fluid of the utilisation circuit, for example a central heating circuit, by means of at least one second exchanger.

The invention preferably relates to the governing of heat pumps of the compression type, wherein a compressor set transmits the cold generating fluid to a condenser releasing calorific energy to the utilisation circuit via the second exchanger.

The invention is also applicable to heat pumps which further comprise at least one superheating exchanger, a dehydrator, an expander or even a stato-thermic compressor of the staged type or having a flow duct converging in continuous manner, as described in the French patent application No. 75/28089.

The present invention provides a method of controlling a heat pump comprising a circuit of a cold generating fluid, a first heat exchanger arranged in said circuit in order to draw calories from a heat containing fluid passing through a cooling circuit, and a second heat exchanger arranged in said circuit in order to transmit calories to a fluid passing through a utilisation circuit, said method comprising the steps of controlling the flow of heat-carrying fluid through said first heat exchanger in dependence upon the temperature of the fluid of the utilisation circuit at the output of said second heat exchanger, and controlling the flow of fluid from said utilisation circuit through said second heat exchanger in dependence upon the temperature or pressure of the cold generating fluid at the outlet of the second heat exchanger.

Preferably a proportion of the fluid flowing in said utilisation circuit is arranged to flow through said second heat exchanger and a proportion is arranged to by-pass said heat exchanger and to be remixed with that flowing through the heat exchanger at the outlet thereof, the said temperature of the fluid of the utilisation circuit being measured after remixing thereof.

According to one embodiment of the invention said circuit of cold generating fluid includes a compressor set, and the operation of the latter is controlled in dependence upon the temperature of the heat-carrying fluid measured at the outlet of the said first heat exchanger.

Advantageously the operation of the compressor set is interrupted when the temperature of the heat-carrying fluid at the outlet of the first heat exchanger reaches a first threshold value, and is started when the said temperature of the heat-carrying fluid reaches a second threshold value greater than the first.

The arrangement may further be such that operation of the compressor set is prevented when the said temperature of the heat-carrying fluid reaches a third threshold value lower than the first.

A heat pump device in accordance with the invention comprises a circuit of a cold generating fluid, a first heat exchanger arranged in said circuit in order to draw calories from a heat-containing fluid passing through a cooling circuit, a second heat-exchanger arranged in said circuit in order to transmit calories to a fluid passing through a utilisation circuit, a temperature sensor arranged in said utilisation circuit at the outlet of said second heat exchanger, a first motorised valve arranged to control the flow of heat-containing fluid from said cooling circuit through the first heat exchanger in accordance with the output of said temperature sensor, a temperature or pressure sensor arranged in said cold generating fluid circuit at the outlet of said second heat exchanger, and a second motorised valve arranged to control the flow of fluid from said utilisation circuit through said second heat exchanger in accordance with the output of said temperature or pressure sensor.

Preferably the second motorised valve is a three-way valve having an inlet arranged to receive the return flow of the fluid of the utilisation circuit, a first outlet arranged to supply the second heat exchanger with a controlled flow of fluid from the utilisation circuit, and a second outlet arranged to convey to the outlet of the second exchanger, upstream of the temperature sensor of the utilisation circuit, the remainder of the fluid which has not passed through the second exchanger.

In one embodiment of the device according to the invention, the said circuit of cold generating fluid further includes a compressor set, and said device further comprises a temperature sensor located in the cooling circuit at the outlet of the first heat exchanger and a control switch arranged to stop the operation of the compressor set when the sensor detects a first threshold temperature and to start the compressor set when the sensor detects a second threshold value greater than the first.

In this case, a circuit breaker may be arranged to prevent any activation of the compressor set when the said temperature sensor located in the cooling circuit detects a third threshold value lower than the first.

The invention is illustrated by way of example in the accompanying drawing, the single FIGURE of which illustrates in diagrammatic form an embodiment of the control device in accordance with the present invention.

Referring to the drawing, a heat pump arrangement according to the invention comprises a circuit 1 of cold generating fluid, including a first heat exchanger or evaporator 2, a compressor 3 and associated driving motor 4, and a second heat exchanger 5 or condenser. An associated control device comprises a motorised valve 6 situated in a cooling circuit 7 upstream of the first heat exchanger 2 in order to regulate the flow of a heat-carrying fluid of the cooling circuit 7 which is allowed to pass through the first heat exchanger 2. This fluid, for example water at a temperature of 12° C. originating from a phreatic sheet, gives up calories to the cold generating fluid of the circuit 1 as it passes through the heat exchanger 2, at a rate depending directly on its rate of flow through the heat exchanger 2. The motorised valve 6 is controlled by means of a temperature sensor 8 which detects the temperature of a fluid of a utilisation circuit at its discharge 9 towards the "consumer". This sensor 8 measures the temperature of a fluid, for example the water of a central heating circuit, orginating on the one hand from the second heat exchanger 5 wherein calories carried by the cold generating fluid are transferred to it, and on the other hand directly from the return 10 of the utilisation circuit, via the pipe 11 and a second motorised valve 12. This motorised valve 12 is a three-way valve by means of which the flow of utilisation fluid passing through the second heat exchanger 5 can be controlled in inverse proportion to the flow passed directly towards the sensor 8 via the pipe 11.

The valve 12 is controlled by a sensor 13 situated at the outlet of the second exchanger 5 on the circuit of cold generating fluid 1 and arranged to detect either the pressure or the temperature of this latter, these two parameters being physically interlinked.

In this way, the regulation of the input flow of the heat-carrying fluid by means of the valve 6 renders it possible to control the quantity of calories transferred by the cold generating circuit 1 to the utilisation circuit, as indicated by the temperature sensor 8 whilst the three-way valve 12 simultaneously assures a correct distribution of the quantity of the utilisation fluid due to pass through the second heat exchanger 5 and of the quantity of this same utilisation fluid returned direct to the sensor 8, as a function of the pressure or of the temperature of the cold generating fluid downstream of the second exchanger which indicates the efficiency of the absorption of the fluid of the utilisation circuit of the calories entrained by the cold generating fluid of the circuit 1 of the heat pump.

For example, for a high pressure or temperature measured by the sensor 13, which demonstrates a low absorption by the fluid of the utilisation circuit of the calories carried in the circuit of cold generating fluid 1, the three-way valve 12 will allow a greater flow to pass into the second heat exchanger 5.

To optimise the heat absorption from the heat-carrying fluid of the cooling circuit 7 without running the risk of impairing the operation of the plant as a whole, a temperature sensor is arranged in the cooling circuit at 15 at the outlet of the first heat exchanger 2, within an assembly 14 which comprises a threshold detector switch and a circuit breaker both of which respond to temperature thresholds being passed. The threshold detector switch stops the compressor set (3, 4) when the sensor of the assembly 14 determines that the temperature of the fluid of the cooling circuit at the outlet of the first exchanger 2 has dropped to a first threshold value, for example 4° C., and switches on the compressor set (3, 4) when the sensor shows that the temperature of the cooling circuit has risen to a second threshold higher than the first, for example 6° C. The circuit breaker on the other hand is tripped when the temperature reaches a third threshold lower than the first, which for example will amount to 2° C. In this case, the circuit breaker will prevent any reactivation of the compressor set (3, 4) until after a manual reset operation, subject to the condition that the temperature of the heat-carrying fluid of the cooling circuit has risen again to beyond 6° C. at the outlet of the first heat exchanger 2.

This control over the compressor set (3, 4) by the assembly 14 renders it possible, in effective manner, to avert any risk of freezing of the plant.

The method and device in accordance with the invention for controlling the operation of a heat pump thus render it possible in a simple and automatic manner to improve the efficiency of the heat exchanges between the cold source and the utilisation circuit whilst making allowance for the demand placed upon the utilisation circuit, as well as for the conditions of the cold source.

What we claim is:

1. A method of controlling a heat pump comprising a circuit of a cold generating fluid, a first heat exchanger arranged in said circuit in order to draw calories from a heat containing fluid passing through a cooling circuit, and a second heat exchanger arranged in said circuit in order to transmit calories to a fluid passing through a utilisation circuit, said method comprising the steps of controlling the flow of heat-carrying fluid through said first heat exchanger in dependence upon the temperature of the fluid of the utilisation circuit at the output of said second heat exchanger, and controlling the flow of fluid from said utilisation circuit through said second heat exchanger in dependence upon the temperature or pressure of the cold generating fluid at the outlet of the second heat exchanger.

2. A method as claimed in claim 1, wherein a proportion of the fluid flowing in said utilisation circuit is arranged to flow through said second heat exchanger and a proportion is arranged to by-pass said heat exchanger and to be remixed with that flowing through the heat exchanger at the outlet thereof, the said temperature of the fluid of the utilisation circuit being measured after remixing thereof.

3. A method as claimed in claim 1 or 2, wherein said circuit of cold generating fluid includes a compressor set, and the operation of the latter is controlled in dependence upon the temperature of the heat-carrying fluid measured at the outlet of the said first heat exchanger.

4. A method as claimed in claim 3, wherein the operation of the compressor set is interrupted when the temperature of the heat-carrying fluid at the outlet of the first heat exchanger reaches a first threshold value, and is started when the said temperature of the heat-carrying fluid reaches a second threshold value greater than the first.

5. A method as claimed in claim 3 or 4, wherein operation of the compressor set is prevented when the said temperature of the heat-carrying fluid reaches a third threshold value lower than the first.

6. A heat pump device, comprising a circuit of a cold generating fluid, a first heat exchanger arranged in said circuit in order to draw calories from a heat-containing fluid passing through a cooling circuit, a second heat-exchanger arranged in said circuit in order to transmit calories to a fluid passing through a utilisation circuit, a temperature sensor arranged in said utilisation circuit at the outlet of said second heat exchanger, a first motorised valve arranged to control the flow of heat-containing fluid from said cooling circuit through the first heat exchanger in accordance with the output of said temperature sensor, a temperature or pressure sensor arranged in said cold generating fluid circuit at the outlet of said second heat exchanger, and a second motorised valve arranged to control the flow of fluid from said utilisation circuit through said second heat exchanger in accordance with the output of said temperature or pressure sensor.

7. A device as claimed in claim 6, in which the second motorised valve is a three-way valve having an inlet arranged to receive the return flow of the fluid of the utilisation circuit, a first outlet arranged to supply the second heat exchanger with a controlled flow of fluid from the utilisation circuit, and a second outlet arranged to convey to the outlet of the second exchanger, upstream of the temperature sensor of the utilisation circuit, the remainder of the fluid which has not passed through the second exchanger.

8. A device as claimed in claim 6, in which the said circuit of cold generating fluid further includes a compressor set, and said device further comprises a temperature sensor located in the cooling circuit at the outlet of the first heat exchanger and a control switch arranged to stop the operation of the compressor set when the sensor detects a first threshold temperature and to start the compressor set when the sensor detects a second threshold value greater than the first.

9. A device as claimed in claim 8, in which a circuit breaker is arranged to prevent any activation of the compressor set when the said temperature sensor located in the cooling circuit detects a third threshold value lower than the first.

* * * * *

UNITED STATES PATENT AND TRADEMARK OFFICE
CERTIFICATE OF CORRECTION

PATENT NO. : 4,165,619
DATED : August 28, 1979
INVENTOR(S) : Edmond Girard

It is certified that error appears in the above—identified patent and that said Letters Patent is hereby corrected as shown below:

On The Title Page Assignee should read

-- Messier, Societe Anonyme --.

Signed and Sealed this

Fifth Day of February 1980

[SEAL]

Attest:

Attesting Officer

SIDNEY A. DIAMOND

Commissioner of Patents and Trademarks